United States Patent
Hsu et al.

(10) Patent No.: US 7,492,352 B2
(45) Date of Patent: Feb. 17, 2009

(54) OPTICAL COMPUTER POINTER AND OPTICAL CURSOR/FRAME CONTROL METHOD

(75) Inventors: Wen-Hao Hsu, Taipei (TW);
Hsaing-Nan Chen, Keelung (TW);
Hou-Ching Chin, Taipei (TW)

(73) Assignee: Transpacific Plasma, LLC, Taipei (TW)

( * ) Notice: Subject to any disclaimer, the term of this patent is extended or adjusted under 35 U.S.C. 154(b) by 479 days.

(21) Appl. No.: 10/916,282

(22) Filed: Aug. 11, 2004

(65) Prior Publication Data

US 2005/0062721 A1 Mar. 24, 2005

(30) Foreign Application Priority Data

Sep. 19, 2003 (TW) .............................. 92126017 A

(51) Int. Cl.
*G06F 3/033* (2006.01)
(52) U.S. Cl. ...................................... 345/161; 345/166
(58) Field of Classification Search ................. 345/161, 345/166, 163; 463/38; 700/85; 74/174, 74/471 XY
See application file for complete search history.

(56) References Cited

U.S. PATENT DOCUMENTS

| 4,647,771 | A | * | 3/1987 | Kato ....................... 250/237 R |
| 5,101,487 | A | * | 3/1992 | Zalenski ..................... 711/221 |
| 5,627,335 | A | * | 5/1997 | Rigopulos et al. ............. 84/635 |
| 6,300,940 | B1 | * | 10/2001 | Ebina et al. ................ 345/161 |
| 6,424,407 | B1 | * | 7/2002 | Kinrot et al. ................... 356/28 |
| 7,046,229 | B1 | * | 5/2006 | Drake ........................ 345/156 |
| 7,079,110 | B2 | * | 7/2006 | Ledbetter et al. ............ 345/156 |
| 7,079,112 | B1 | * | 7/2006 | Liebenow ................... 345/158 |
| 2007/0161400 | A1 | * | 7/2007 | Sharp et al. .............. 455/550.1 |

* cited by examiner

*Primary Examiner*—Chanh Nguyen
*Assistant Examiner*—Pegeman Karimi
(74) *Attorney, Agent, or Firm*—Workman Nydegger

(57) ABSTRACT

An optical pointer includes a housing, a movable plate, a manipulable member and a displacement detecting unit. The movable plate is disposed in the housing and has a recognizable pattern. The manipulable member is manipulated by a user to transmit the movable plate to effect two-dimensional movement inside the housing. The displacement detecting unit is disposed in the housing for optically detecting the recognizable pattern of the moveable plate, and generating a control signal indicative of a displacement of the movable plate according to detected image change of the recognizable pattern.

6 Claims, 7 Drawing Sheets

OPTICAL COMPUTER POINTER AND OPTICAL CURSOR/FRAME CONTROL METHOD

FIELD OF THE INVENTION

The present invention relates to a computer pointer, and more particularly to an optical computer pointer for cursor or frame control via a window interface. The present invention also relates to an optical cursor/frame control method, and more particularly to an optical cursor/frame control method for use in a computer with a window interface.

BACKGROUND OF THE INVENTION

Optical technologies have been widely employed in pointer systems for cursor or frame control on computer displays. For example, optical mice and optical trackballs are the most popular pointer devices currently. The optical pointer device works by detecting a specified image, tracking the displacement of the specified image, and then generating responsive signals to the computer to conduct the movement of a cursor on the display.

Referring to FIG. 1, a working principle of a conventional optical mouse is schematically shown. The optical mouse principally comprises a housing 1, a light source 10 such as a light-emitting diode (LED) and an image receiver 11. The optical mouse is required to work on a plane 12 of a certain material. The plane 12 has to be made of a light-reflective material so that the light emitted by the light source 10 can be reflected by the plane 12 as an image signal and then received by the image receiver. The LED light source and image receiver is now commercially available as an image sensor module.

When the optical mouse rests on the plane 12, the image data of the plane 12 is recorded by the image sensor at a predetermined time interval, wherein the light source generator 10 continuously emits light, and the light reflected by the plane 12 is received by the image receiver 11. With the detected movement of the optical mouse from a first position to a second position on the plane 12 in response to the manipulation of the user, the image data of the plane 12 obtained by the image sensor change. By comparing the recorded image data at the first and the second positions, the displacement data of the optical mouse from the first position to the second position can be realized. The displacement data including the movement direction and distance are then provided for the computer to correspondingly control the movement direction and distance of the cursor or the like.

The conventional optical mouse, unfortunately, has inherent requirements. That is, a plane having at least certain area enough for movably operating the optical mouse is required, and the plane is required to be smooth and flat enough for the optical mouse to smoothly move thereon and for the light emitted by the light source to be reflected and received as expected. In other words, the application of the optical mouse is restricted.

Referring to FIG. 2, another conventional optical pointer device so-called as an optical trackball is shown. The optical trackball principally comprises a housing 2, a trackball element 21 and a displacement detector (not shown) inside the housing 2 to work with the trackball element 21. The image sensor module used in the device of FIG. 1 can be used herein as the displacement detector. When a user rotates the trackball element 21 to result in the movement of the trackball surface relative to the displacement detector, the image data of the trackball surface detected by the displacement detector change so as to obtain the displacement data of the trackball element 21 accordingly. Based on the displacement data, the corresponding movement direction and distance of a cursor or the like on the display is conducted.

In general, a user manipulates the optical trackball by rotating the trackball element 21 with his thumb of the hand holding the housing 2 (or the index finger when the trackball element 21 is mounted on the upper surface of the housing 21. The rotation of a ball element with a single finger, however, is hard to be precisely controlled.

SUMMARY OF THE INVENTION

The present invention provides an optical computer pointer for cursor and/or frame control without being moved on a worktable.

The present invention also provides an optical computer pointer for cursor and/or frame control, which can be operated in an easy and precise manner.

The present invention also provides a novel cursor control method, which can be used in an optical computer pointer to optically determine the desired displacement triggered by the user so as to reflect the cursor or frame shift on the computer display.

In accordance with a first aspect of the present invention, there is provided an optical pointer for use in a computer. The optical pointer comprises a housing, a movable plate, a manipulable member and a displacement detecting unit. The movable plate is disposed in the housing and has a recognizable pattern. The manipulable member is manipulated by a user to transmit the movable plate to effect two-dimensional movement inside the housing. The displacement detecting unit is disposed in the housing for optically detecting the recognizable pattern of the moveable plate, and generating a control signal indicative of a displacement of the movable plate according to detected image change of the recognizable pattern.

Preferably, the optical pointer is a handheld pointer.

In an embodiment, the manipulable member comprises a joystick portion and a link rod portion. The joystick portion protrudes from a surface of the housing to be manipulated by the user. The link rod portion has a first end coupled to the joystick portion and a second end coupled to the movable plate for transmitting the movable plate to move with the joystick portion.

In an embodiment, the housing comprises a rigid portion and an elastic portion. The rigid portion accommodates therein the movable plate, the link rod of the manipulable member and the displacement detecting unit and has thereon a first opening. The elastic portion covers the first opening of the rigid portion and has a second opening in the midst thereof for receiving the joystick portion of the manipulable member. The joystick portion is movable by pushing against the elastic portion to effect the two-dimensional movement and resiled when the pushing force is released.

In an embodiment, the housing has therein a cave structure partially exposed to the displacement detecting unit through a sensing window, and the movable plate is moved with the manipulable member in the cave structure to be detected by the displacement detecting unit.

In an embodiment, the recognizable pattern includes a basic pattern region and a margin pattern region surrounding the basic pattern region, and the moving limit of the manipulable member is determined when the displacement detecting unit detects the margin pattern.

In an embodiment, the movable plate is made of opaque flexible plastic. In such case, the displacement detecting unit comprises a light source and an image sensor. The light source is disposed at a side of the movable plate for projecting light onto the movable plate. The image sensor is disposed at the side of the movable plate for receiving the light reflected from the movable plate and generating image signals at intervals for determining whether an image change occurs. Preferably, the displacement detecting unit further comprises a signal processor electrically connected to the image sensor for comparing two adjacent image signals to determine whether the image change occurs.

Preferably, the image change occurs is determined by a computer.

In an embodiment, the movable plate is made of transparent flexible plastic. In such case, the displacement detecting unit comprises a light source and an image sensor. The light source is disposed at a side of the movable plate for projecting light onto the movable plate. The image sensor is disposed at another side of the movable plate opposite to the light source for receiving the light penetrating through the movable plate and generating image signals at intervals for determining whether an image change occurs. Preferably, the displacement detecting unit further comprises a signal processor electrically connected to the image sensor for comparing two adjacent image signals to determine whether the image change occurs.

In an embodiment, the optical pointer further comprises a triggering button attached to the manipulable member and communicating with the computer. The triggering button is pushed to have the control signal processed and released to have the control signal disregarded.

In accordance with a second aspect of the present invention, there is provided an optical cursor/frame control method on a display. Firstly, a plate having a basic pattern and a margin pattern is moved from a first position to a second position. Then, images of the plate at the first and second positions are detected to obtain first and second image signals, respectively. Then, a displacement from the first position to the second position is determined according to an image change between the first and second image signals. Then, a cursor or frame shift on the display with a level is effected corresponding to the displacement. Afterward, a cursor or frame shift on the display exceeding the level is effected when the margin pattern is detected at the second position.

In an embodiment, the plate is moved in a two-dimensional manner, and the margin pattern surrounds the basic pattern.

In an embodiment, the method further comprises a step of pushing a triggering button while moving the plate, thereby effecting the cursor or frame shift on the display with the level corresponding to the displacement.

In an embodiment, the method further comprises a step of keeping on pushing the triggering button when the plate is fixed at the second position and the margin pattern is detected, thereby further effecting the cursor or frame shift on the display exceeding the level.

In an embodiment, the plate is moved by receiving a force and automatically resiled to a certain position lying within the basic pattern when the force is released.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
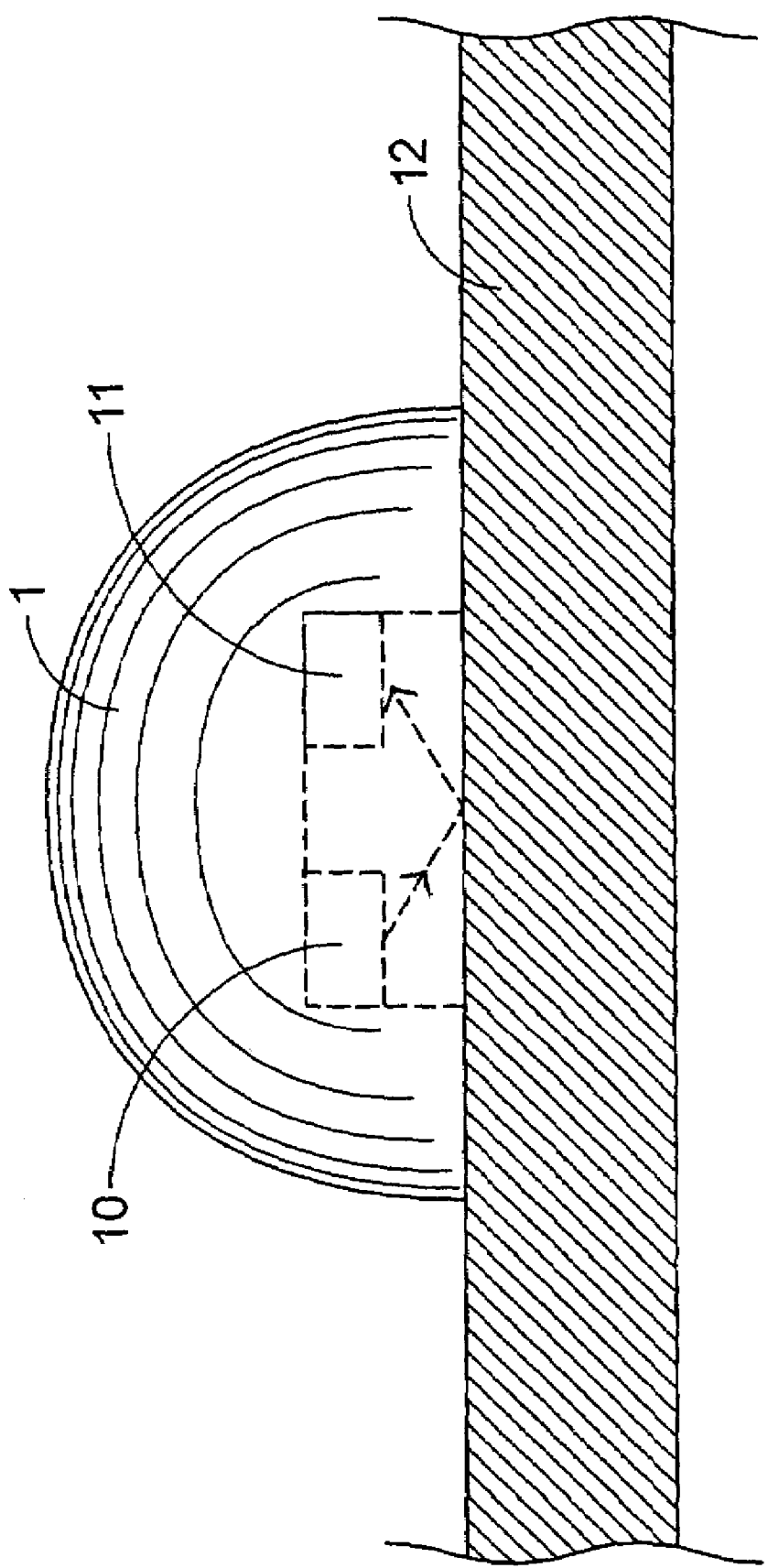
FIG. 1 is a schematic diagram showing the optical cursor control means of a conventional optical mouse pointer.
Figure 2:
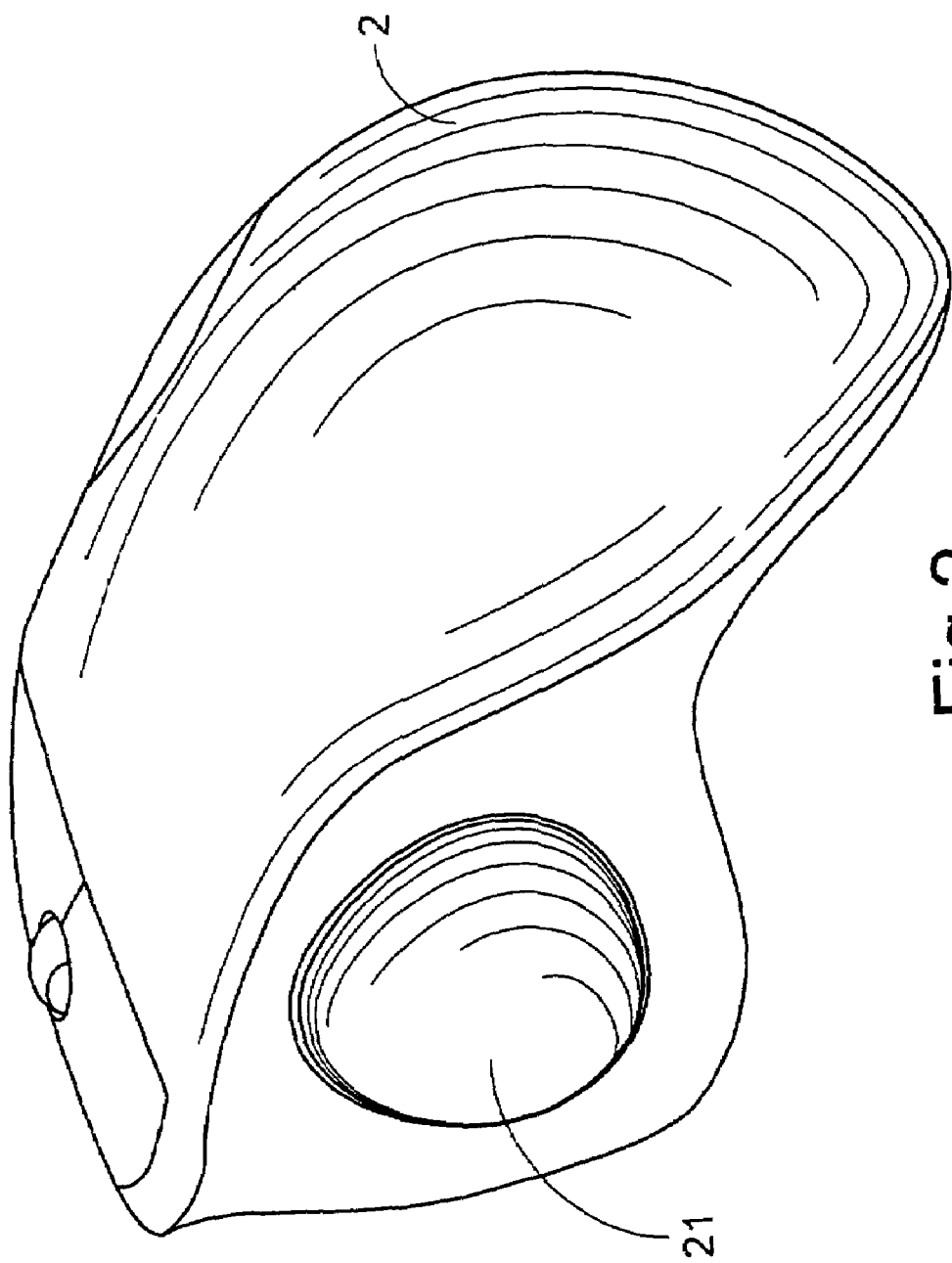
FIG. 2 is a schematic perspective diagram of a conventional optical trackball pointer.
Figure 3:
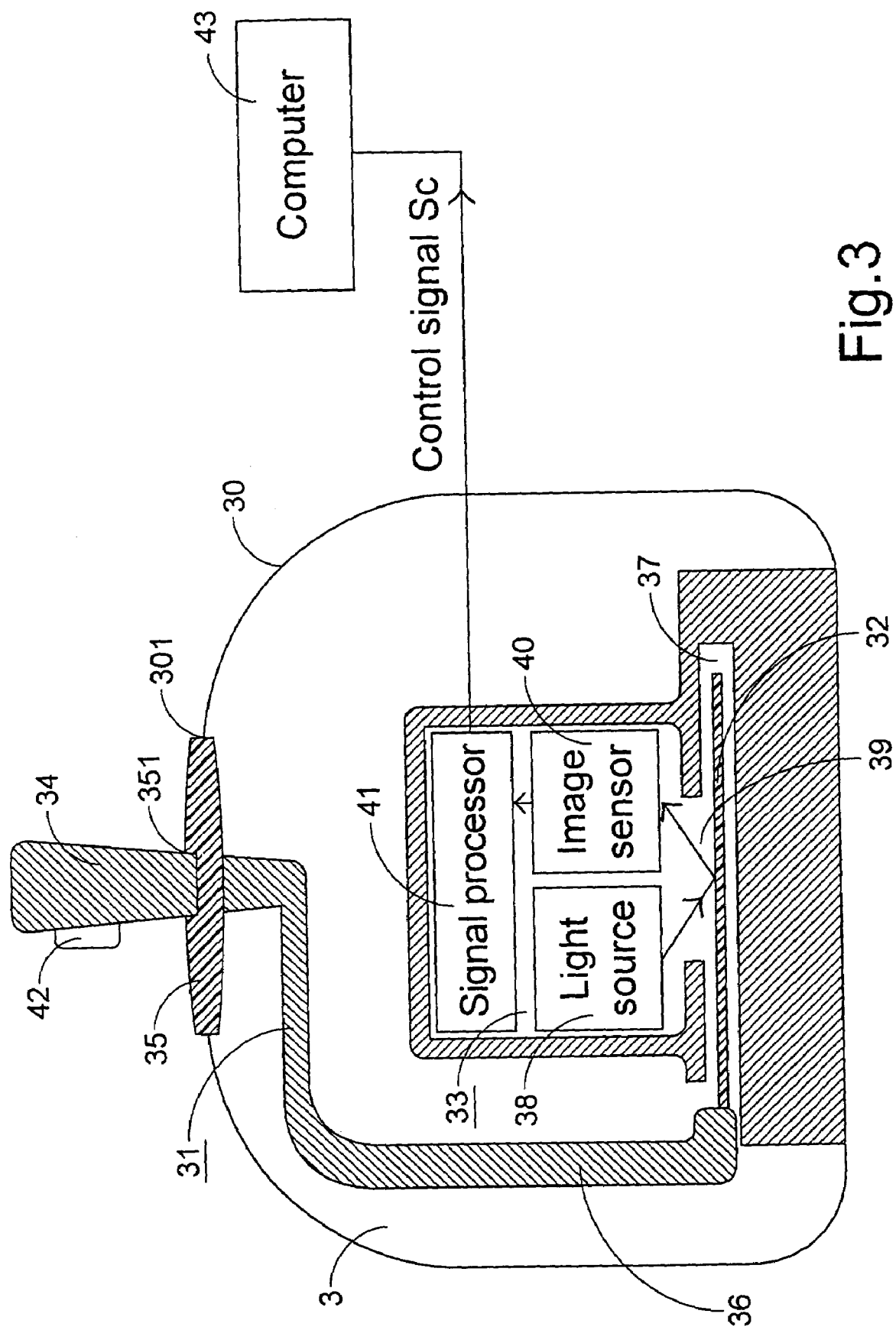
FIG. 3 is a cross-sectional diagram schematically showing the cursor/frame control means of an optical pointer according to a first embodiment of the present invention.

Referring to FIG. 3, an optical pointer for use with a window interface of a computer to control cursor/frame shift is illustrated. The optical pointer principally comprises a manipulable member 31, a movable plate 32 and a displacement detecting unit 33. The housing 3 of the optical pointer comprises a rigid portion 30 and an elastic portion 35. The rigid portion 30 accommodates therein a portion of the manipulable member 31, the movable plate 32 and the displacement detecting unit 33. The rigid portion 30 has an opening 301 on the top surface thereof. The elastic portion 35 covers the opening 301 of the rigid portion 30 and has an opening 351 in the midst thereof for exposing another portion of the manipulable member 31.

The movable plate 32 is disposed in a cave structure 37 in the housing 3 and transmitted to effect two-dimensional movement inside the cave 37 by the manipulable member 31. The movable plate 32 has a recognizable pattern for displacement detection, which will be described later. The movable plate 32 is preferably made of flexible material such as a plastic film to conform to the cave structure.

The manipulable member 31 comprises a joystick portion 34 and a link rod portion 36. The joystick portion 34 protrudes from the opening 351 of the housing 3. The upper end and the lower end of the link rod portion 36 are coupled to the joystick portion 34 and the movable plate 32, respectively. Since the elastic portion 35 is made of an elastic material such as silicon rubber, the elastic portion 35 can be deformed to provide movement space of the joystick portion 34 when the user pushes the joystick portion 34 against the elastic portion 35. When the user manipulates the joystick 34 to effect two-dimensional movement inside the elastic portion 35, the movable plate 32 is transmitted via the link rod portion 36 to move in the cave 37 accordingly.

The displacement detecting unit 33 is disposed in the housing 3 for determining the moving level of the movable plate 32 by optically detecting the image change of the recognizable pattern of the moveable plate 31. The displacement detecting unit 33 comprises a light source 38, an image sensor 40 and a signal processor 41. In a case that the movable plate 32 is made of opaque flexible plastic, the displacement detecting unit 33 works in a light-reflective manner. Meanwhile, a light-transmissive window 39 is created in the roof of the cave structure 37 to expose the movable plate 32 to the displacement detecting unit 33. In this embodiment, the light source 38, image sensor 40 and signal processor 41 are disposed at the same side of the movable plate 32. The light source 38 projects light onto the movable plate 32 through the window 39 and the image sensor 40 receives the reflective light from the movable plate 32 through the window 39 to generate image signals, which are transmitted to the signal processor 41 at intervals. Two adjacent image signals are compared by the signal processor 41 to determine whether any image change occurs. Since the movable plate 32 has recognizable pattern thereon, the displacement of the movable plate 32 can be determined according to the detected image shift of the recognizable pattern. In response, a control signal Sc indicative of the displacement of the movable plate 32 is transmitted to the computer 43 to shift cursor or frame on the display (not shown).

As mentioned above, the elastic portion 35 of the housing 3 is deformed when the user pushes the joystick portion 34 of the manipulable member 31 against the elastic portion 35. When the user's pushing force is released after proper cursor or frame shift is achieved, the joystick portion 34 will resile to the original position in the midst of the elastic portion 35. In order to prevent the cursor or frame from undesirable backward shift on the way that the joystick portion 34 resiles to the original position, the optical pointer is preferably provided with a triggering button 42 attached to the joystick 34 at a position easy to be manipulated by the user while he is holding the joystick 34. The triggering button 42 is electrically connected to the computer 43. By pushing the triggering button 42 while moving the joystick 34, the system software determines that an operational mode is entered so that the computer 43 processes the control signal Sc to perform corresponding cursor/frame shift. During the recovery of the joystick 34 to the middle position, the triggering button 42 should be released to suspend the operation mode so as to avoid the undesirable cursor/frame shift. Alternatively, it is also feasible to enter the operational mode without pushing the triggering button 42 while suspending the operational mode by pushing the triggering button 42.

Figure 4A:
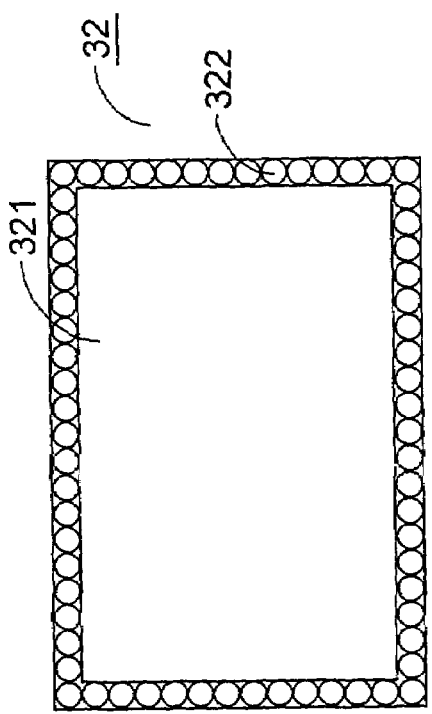
FIGS. 4(a)~4(b) are schematic diagrams exemplifying a cursor/frame control method according to the present invention with the use of the optical pointer of FIG. 3.
Figure 4B:
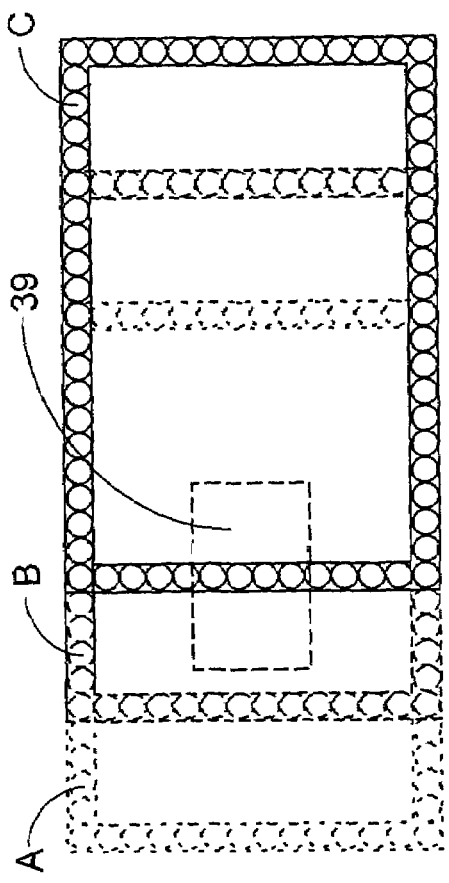

Please refer to FIG. 4(*a*), which is a schematic diagram illustrating the recognizable pattern of the movable plate 32. The recognizable pattern includes a basic pattern region 321 and a margin pattern region 322. The margin pattern region 322 surrounds the basic pattern region 321, and is distinguishable from the basic pattern region 321. The displacement detection inside the basic pattern region 321 can be performed by any proper algorithm known to those skilled in the art. The arrangement of the margin pattern region 322, on the other hand, facilitates the operation of the present optical pointer, which will be described hereinafter.

According to the present optical displacement detecting method, when the movable plate 32 is moved from a position A to a position B along the direction indicated by an arrow, as shown in FIG. 4(*b*), in which only the basic pattern 321 is detected. Meanwhile, the cursor or frame is shifted at a level proportional to the displacement between the position A and the position B. Once the movable plate 32 is further moved to a position C where the margin pattern 322 is detected by the displacement detecting unit 33, the cursor or frame will be continuously shifted even though the plate 32 is not further moved. For example, it is designed that the margin pattern region 322 can be detected by the displacement detecting unit 33 as the manipulable member 31 is pushed against the elastic portion 35 and has reached the moving limit. In other words, if the cursor or frame needs to be shifted to a greater extent exceeding the detected displacement of the movable plate 32, the user could keep the manipulable member 31 at the moving limit position, and for example, simultaneously push the triggering button 42.

Figure 5:
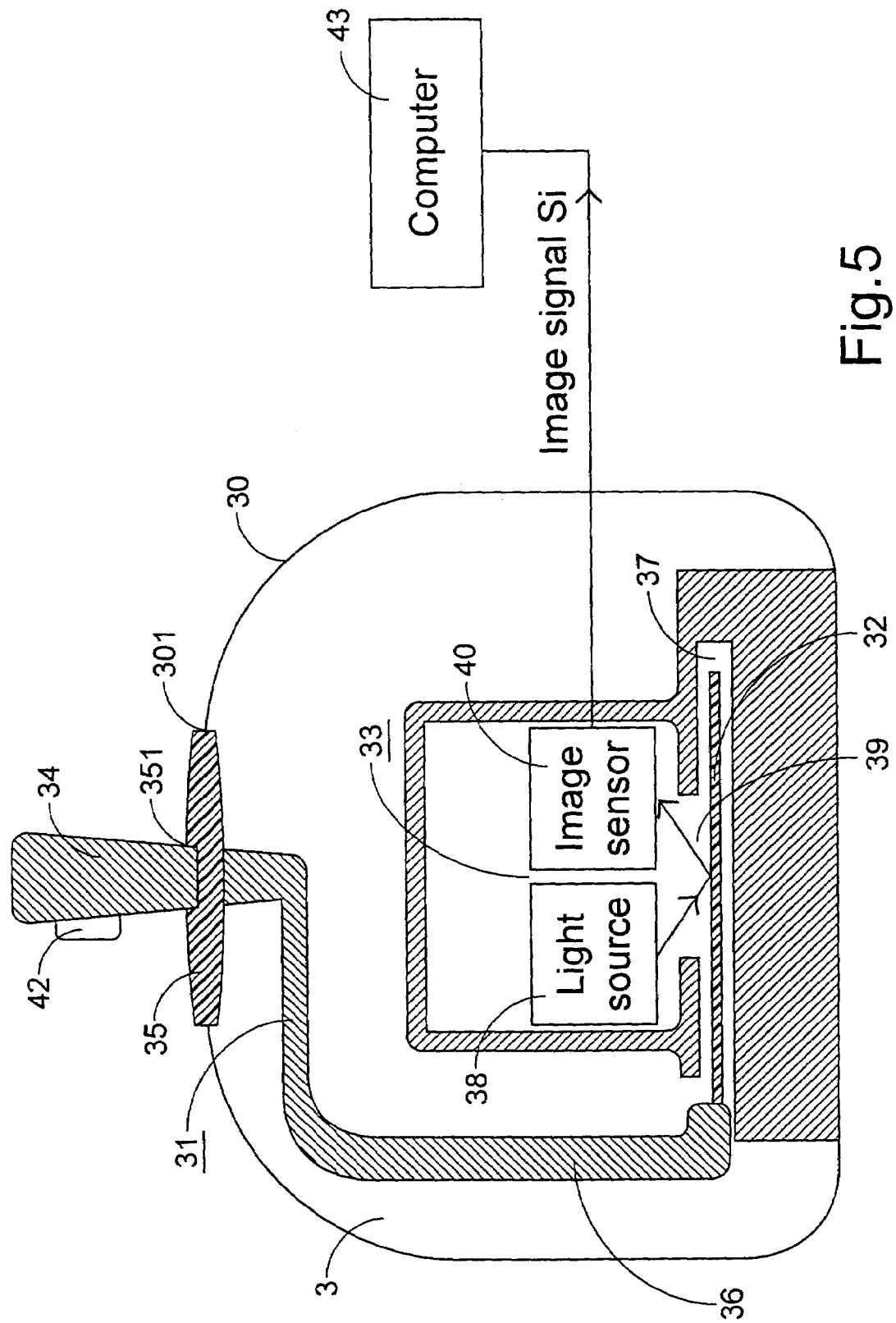
FIG. 5 is a cross-sectional diagram schematically showing the cursor/frame control means of an optical pointer according to a second preferred embodiment of the present invention.

Another embodiment of an optical pointer according to the present invention is illustrated in FIG. 5. This embodiment is similar to that illustrated in FIG. 3 except that the image signals Si generated by the image sensor 40 are directly transmitted to the computer 43 to be further processed instead of being preliminarily processed in the optical pointer. In other words, the signal processor 41 of FIG. 3 can be omitted from the displacement detecting unit 33.

Figure 6:
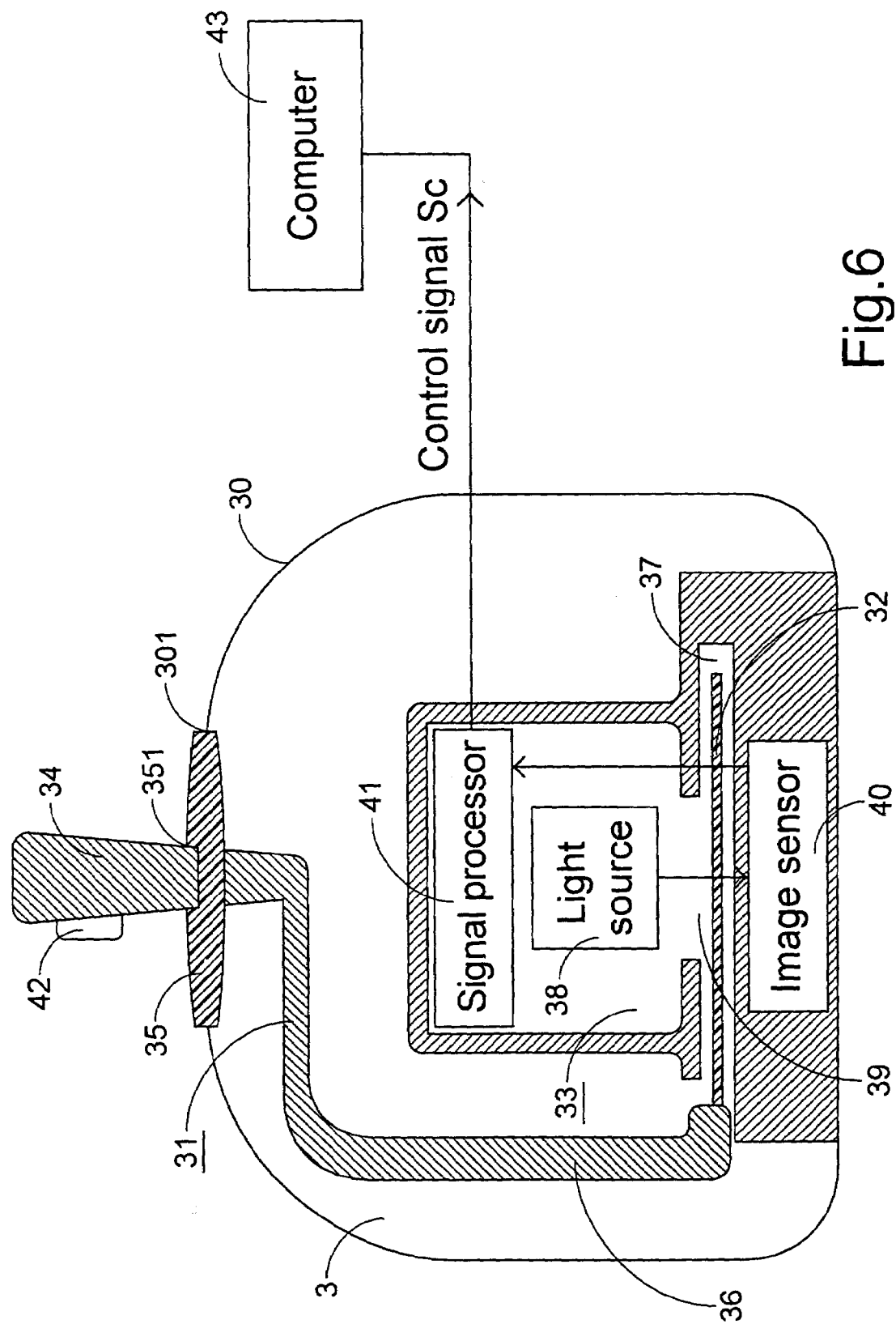
FIG. 6 is a cross-sectional diagram schematically showing the cursor/frame control means of an optical pointer according to a third embodiment of the present invention.

Referring to FIG. 6, a further embodiment of an optical pointer according to the present invention is illustrated. This embodiment is similar to that illustrated in FIG. 3 except that the movable plate 32 is made of light-transmissible flexible plastic and the displacement detecting unit 33 works in a light-penetrative manner. Thus, the light source 38 and the image sensor 40 of the displacement detecting unit 33 are disposed at opposite sides of the movable plate 32. After the light source 38 projects light onto the movable plate 32, the image sensor 40 receives the light penetrating through the movable plate 32 via the window 39. In response to the penetrative light, image signals are generated and transmitted to the signal processor 41 at intervals. According to the pattern difference of the movable plate 32 determined by the signal processor 41, a control signal Sc indicative of the displacement of the movable plate 32 is transmitted to the computer 43 to shift cursor or frame on the display (not shown).

Figure 7:
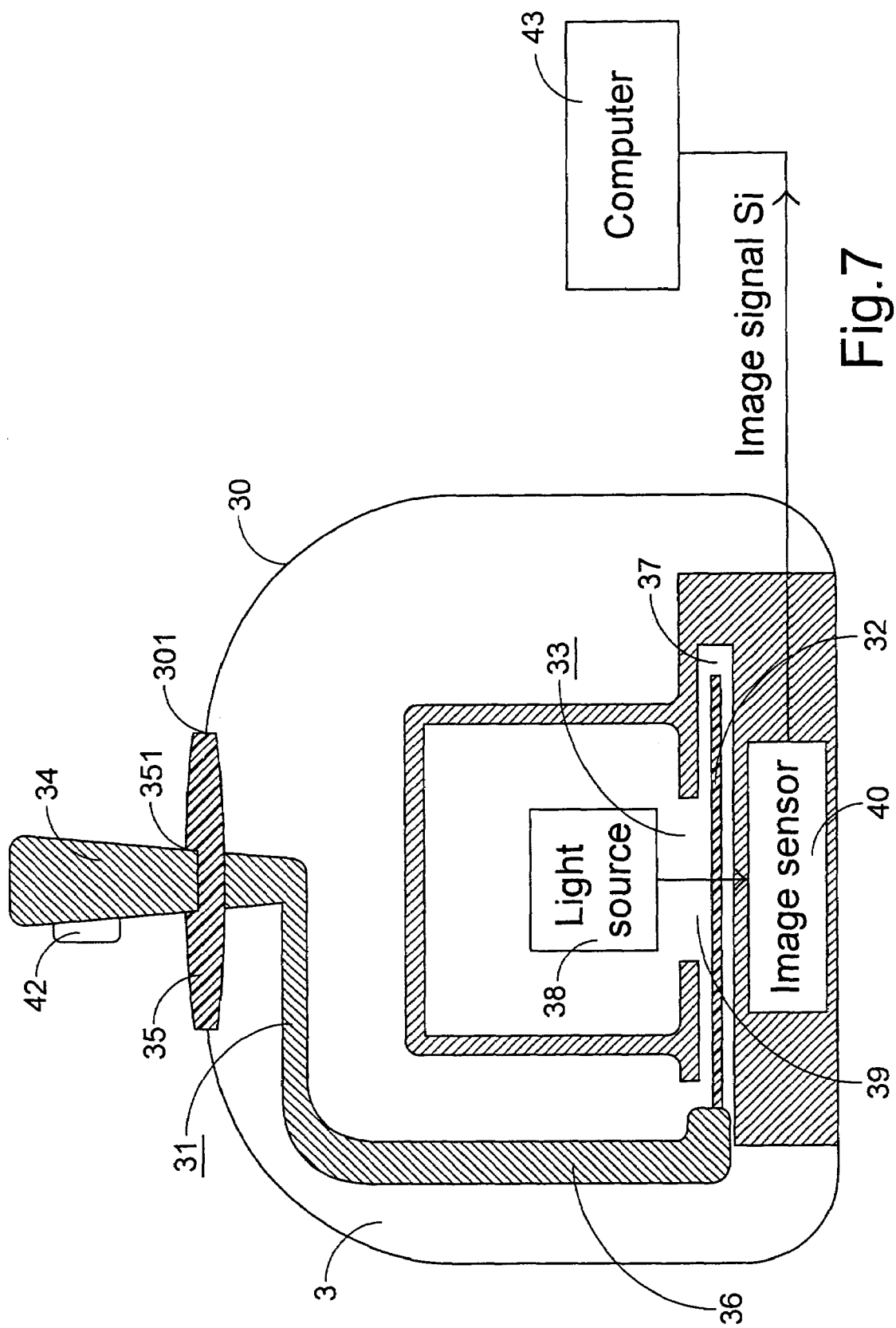
FIG. 7 is a cross-sectional diagram schematically showing the cursor/frame control means of an optical pointer according to a fourth embodiment of the present invention.

A still further embodiment of an optical pointer according to the present invention is illustrated in FIG. 7. This embodiment is similar to that illustrated in FIG. 6 except that the signal processor 41 is omitted from the displacement detecting unit 33. Thus, image signals Si generated by the image sensor 40 are directly transmitted to the computer 43 to be processed.

From the above description, the optical pointer of the present invention is capable of controlling the cursor and/or frame shift on a computer display in an optical way. By properly manipulating the manipulable member, the movable plate is transmitted to effect two-dimensional movement inside the housing in an easy and precise manner. Since the movement of the optical pointer required for corresponding to the cursor/frame shift is effected inside the housing area of the optical pointer, the cursor/frame control can be performed within limited space.

The optical pointer according to the present invention can further include some common components used in the typical optical mouse, for example a plurality of click buttons and a scroll wheel, which are previously programmed to perform specified functions. For example, a right button is programmed to invoke context menu, a left button is programmed to make a selection or enter a command, and the scroll wheel is used to effortlessly navigate continuous pages without operating on the on-screen scroll bar. The click buttons and scroll wheel are preferably arranged at positions easy to be manipulated by the user while he is holding the manipulable member.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical pointer comprising:
   a housing;

a movable member disposed in the housing, the movable member comprising a recognizable pattern;

a manipulable member capable of being manipulated to move the movable member inside the housing; and a displacement detecting unit disposed in the housing, the displacement detecting unit being capable of optically detecting the recognizable pattern of the moveable member, and further capable of generating a signal indicative of a displacement of the movable member;

wherein the recognizable pattern comprises a first pattern portion having a perimeter and a second pattern portion surrounding the perimeter of the first pattern portion; and wherein a moving limit of the manipulable member is determined if the displacement detecting unit detects the second pattern portion.

2. The optical pointer as in claim 1, wherein the displacement detecting unit comprises:

a light source capable of projecting light onto the movable member; and an image sensor capable of receiving the light reflected from the movable member and capable of generating image signals at intervals for determining whether an image change occurs.

3. The optical pointer as in claim 1, further comprising a triggering button capable of being pushed to have the signal processed and further capable of being released to have the signal disregarded.

4. An apparatus comprising:

an optical pointer comprising:

a movable member including a generally flat portion and at least one pattern on the generally flat portion, the at least one pattern comprising a first pattern having a perimeter and a second pattern that surrounds the perimeter of the first pattern;

a light source configured to project light onto the generally flat portion of the movable member;

a sensor configured to receive light that is projected onto the generally flat portion of the movable member by the light source;

a housing that houses the movable member, the light source, and the sensor, the movable member being movable among a plurality of locations within the housing; and a displacement detecting unit that includes the light source and the sensor, the displacement detecting unit being configured to detect the second pattern and to generate a control signal at least partially in response to detecting the second pattern.

5. The apparatus as in claim 4, wherein the sensor is configured to receive light that is projected onto the generally flat portion of the movable member by the light source and is reflected off the generally flat portion of the movable member.

6. The apparatus as in claim 4, wherein the sensor is configured to receive light that is projected onto the generally flat portion of the movable member by the light source and is passed through the movable member.

* * * * *